(12) United States Patent
Dal Bello et al.

(10) Patent No.: US 12,290,016 B2
(45) Date of Patent: May 6, 2025

(54) SYSTEM AND METHOD FOR AUTOMATING PROPAGATION MATERIAL SAMPLING AND PROPAGATION MATERIAL SAMPLING EQUIPMENT

(71) Applicant: Accenture Global Solutions Limited, Dublin (IE)

(72) Inventors: Thiago Dal Bello, Joinville (BR); Thiago Da Silva, Joinville (BR); Thiago Felipe De Macedo, Joinville (BR); Cleber Lucoli, Joinville (BR); Jonathan Diego Klein, Joinville (BR)

(73) Assignee: Accenture Global Solutions Limited, Dublin (IE)

( * ) Notice: Subject to any disclaimer, the term of this patent is extended or adjusted under 35 U.S.C. 154(b) by 355 days.

(21) Appl. No.: 17/771,959

(22) PCT Filed: Nov. 3, 2020

(86) PCT No.: PCT/BR2020/050450
§ 371 (c)(1),
(2) Date: Apr. 26, 2022

(87) PCT Pub. No.: WO2021/081614
PCT Pub. Date: May 6, 2021

(65) Prior Publication Data
US 2022/0369536 A1 Nov. 24, 2022

(30) Foreign Application Priority Data
Nov. 1, 2019 (BR) .......................... 102019023017-7

(51) Int. Cl.
*G01N 1/04* (2006.01)
*A01C 1/02* (2006.01)

(52) U.S. Cl.
CPC .................... *A01C 1/02* (2013.01); *G01N 1/04* (2013.01)

(58) Field of Classification Search
CPC ...................................................... G01N 1/04
(Continued)

(56) References Cited

U.S. PATENT DOCUMENTS

| 3,117,452 A | 1/1964 | Bowlier |
| 2007/0207485 A1 | 9/2007 | Deppermann et al. |

(Continued)

FOREIGN PATENT DOCUMENTS

| BR | PI0414708-1 | 11/2006 |
| BR | PI0514276-8 | 12/2017 |

(Continued)

*Primary Examiner* — Alexander A Mercado
*Assistant Examiner* — Rodney T Frank

(57) ABSTRACT

The present invention describes an automatic propagation material sampling system, a propagation material sampling automation process and propagation material sampling equipment. More specifically, the present invention comprises a machine for anti-contaminating captation of propagation material samples in a non-destructive way, that is, maintaining the ability of subsequent propagation of the sampled propagation material, transports and tracks the sample without its contamination with residues of other materials, as well as tracks samples with desirable characteristics. The present invention is located in the fields of agronomic engineering and automation engineering, focused on the area of sample testing automation.

9 Claims, 12 Drawing Sheets

(58) Field of Classification Search
USPC .......................................................... 73/863
See application file for complete search history.

(56) References Cited

U.S. PATENT DOCUMENTS

| | | | |
|---|---|---|---|
| 2008/0131924 A1* | 6/2008 | Cope .................... | G01N 1/2035 |
| | | | 435/40.51 |
| 2008/0317279 A1 | 12/2008 | Deppermann et al. | |
| 2011/0179888 A1 | 7/2011 | Danesh | |
| 2013/0176553 A1* | 7/2013 | Cope ...................... | G01N 21/33 |
| | | | 356/402 |
| 2017/0027102 A1 | 2/2017 | Fredericksen et al. | |

FOREIGN PATENT DOCUMENTS

| | | |
|---|---|---|
| BR | 1120130013303 | 4/2019 |
| BR | PI0514685-2 | 4/2019 |
| BR | 112019027389 | 7/2020 |
| CN | 104458319 | 3/2015 |
| CN | 205665044 U | 10/2016 |
| CN | 109060451 | 12/2018 |
| WO | 2012122156 A2 | 9/2012 |
| WO | 2018014586 | 1/2018 |

* cited by examiner

SYSTEM AND METHOD FOR AUTOMATING PROPAGATION MATERIAL SAMPLING AND PROPAGATION MATERIAL SAMPLING EQUIPMENT

FIELD OF THE INVENTION

The present invention describes an automatic propagation material sampling system, a propagation material sampling automation process and propagation material sampling equipment. More specifically, the present invention comprises a machine for anti-contaminating captation of a propagation material sample in a non-destructive way, that is, maintaining the ability of subsequent propagation of the sampled propagation material, transports and tracks the sample without its contamination with residues from other materials and samples. The present invention is located in the fields of agronomic engineering and automation engineering, focused on the area of sample testing automation.

BACKGROUND OF THE INVENTION

Propagation material sampling, such as seed sampling, has been used to improve seed quality. Seed characteristics, such as higher productivity, resistance to pests, diseases, resistance to periods of drought or excessive rain, have been selected as desirable characteristics in propagation material.

Currently, sampling of propagation materials is conducted in high-cost machines and equipment, with expensive processing and difficult to handle. In addition, processes lack traceability and adequate monitoring of the entire process, such as tracking samples and propagation materials.

In the search for the state of the art in scientific and patent literature, the following documents were found that deal with the subject:

Document BR112019027389-1 reveals an automated system for removing seed tissues sample, where the cutting of seed packets is performed by a worker and the seeds are then dumped into a first machine that performs imaging for seed differentiation to perform impurity removal and then conduct further sampling by chipping the seeds. Thus, in the solution proposed by BR112019027389-1, the material removed may be contaminated during transport with other seed fragments, dust particles or other particles present in the conveyor. Thus, the quality of the sample may be low, as several other fragments come into contact with the sample to be analyzed in the laboratory.

Document CN104458319 reveals an automatic seed sampling machine, in which plates containing seeds are moved by means of a conveyor belt. A robot picks up the plates and/or seeds. Using a camera, the system differentiates seeds from impurities and generates coordinates for the robot to pick up the plates and/or seeds. The same robot is used to collect seed samples. Thus, in the solution proposed by CN104458319, the material removed may be contaminated during transport with other seed fragments, dust particles or other particles present in the conveyor. Thus, the quality of the sample may be low, as several other fragments come into contact with the sample to be analyzed in the laboratory.

Document CN109060451 reveals an automatic seed sampling machine, which, by means of a robot, allows loading plates by means of pneumatic grippers and/or suction grippers and reading code from the plates and/or seeds by means of a camera. For cutting seed bags, laser cutting is conducted. Thus, in the solution proposed by CN109060451, the material removed may be contaminated during transport with other seed fragments, dust particles or other particles present in the conveyor. Thus, the quality of the sample may be low, as several other fragments come into contact with the sample to be analyzed in the laboratory.

Document PI0414708-1 reveals a seed processing machine comprising a turntable with seed captation trays and seed plate arrangement, an inspection equipment for differentiating seeds and impurities and a robot for handling the seeds. Thus, in the solution proposed by PI0414708-1, the material removed may be contaminated during transport with other seed fragments, dust particles or other particles present in the conveyor. Thus, the quality of the sample may be low, as several other fragments come into contact with the sample to be analyzed in the laboratory.

Document WO2018014586 reveals an automatic sampling seed cutting device, where this device comprises a robot for handling the seeds by means of a pneumatic gripper and/or suction gripper, comprises an inspection equipment for the differentiation of seeds and impurities by camera and a second robot for sample captation. Thus, in the solution proposed by WO2018014586, the material removed may be contaminated during transport with other seed fragments, dust particles or other particles present in the conveyor. Thus, the quality of the sample may be low, as several other fragments come into contact with the sample to be analyzed in the laboratory.

Document PI0514685-2 reveals an automated seed sampler system comprising a sampling station, a sampler for removing material from a seed, a seed conveyor for transporting the seed from the sampling station to a compartment in a seed tray and a conveyor to transport the material removed from the seed to a compartment in a sample tray. Thus, the material removed may be contaminated during transport with other seed fragments, dust particles or other particles present on the conveyor. Thus, the quality of the sample may be low, as several other fragments come into contact with the sample to be analyzed in the laboratory.

Document PI0514276-8 discloses an apparatus for automated seed testing comprising a test device for analyzing a seed, a conveyor for automatically and individually transporting a seed from a plurality of seeds in a tray, and a two-dimensional positioning system for bringing the tray compartments into alignment with the conveyor. Thus, the seed can be contaminated with other seed fragments, dust particles, etc., during transport to individual compartments in a tray. This way, the quality of the sample is compromised as the sample is contaminated with other particles during transport.

Document BR1120130013303 reveals a seed sampling system and automated method for removing tissue samples from seeds, wherein the system comprises a seed loading assembly, an automated seed sampling assembly, and an automated seed transport assembly. In this way, the use of a seed sample conveyor can compromise the quality of the sample, since during transport the sample may come into contact with fragments of other seeds or other undesirable particles for sample accuracy. Thus, the sample taken is contaminated during transport, making the sample of poor quality.

Thus, from what can be seen from the researched literature, no documents were found anticipating or suggesting the teachings of the present invention, so that the solution proposed here has novelty and inventive activity compared to the state of the art.

SUMMARY OF THE INVENTION

In this way, the present invention solves the problems of the state of the art from an automatic system, an automation process and a propagation material sampling equipment are able to extract a sample of a propagation material in a non-destructive way, or that is, maintaining the ability of subsequent propagation of the sampled propagation material, in addition to transporting said sample without contaminating it.

In a first object, the present invention presents an automatic propagation material sampling system that comprises at least one anti-contaminant propagation material sample captation machine (B), wherein the anti-contaminant sample captation machine (B) comprises transfer of the propagation material sample, projecting it in free fall; and the anti-contaminant sample captation machine (B) extracts each sample from the propagation material maintaining the propagating capacity of the sampled propagation material.

In a second object, the present invention presents a propagation material sampling automation process that comprises the steps of: positioning propagation material in an anti-contaminant sample captation machine (B); taking a sample of propagation material by a sample extraction device (B60) of the anti-contaminant sample captation machine (B); anti-contaminant transfer of the propagation material sample; captation of a sample from the propagation material by a sample collection device (B80) of the anti-contaminant sample captation machine (B); sample output for analysis; and storage of sampled propagation material.

In a third object, the present invention presents a propagation material sampling equipment that comprises at least one anti-contaminating propagation material sample captation machine (B), said machine (B) comprising: at least one propagation material sample extraction device (B60); and at least one sample collection device (B80); wherein the anti-contaminant sample captation machine (B) comprises anti-contaminant transfer of the propagation material sample, projecting it in free fall from the sample extraction device (B60) to the sample collection device (B80); and the sample extraction device (B60) extracts each sample of propagation material while maintaining the propagating capability of the sampled propagation material.

These and other objects of the invention will be immediately appreciated by those skilled in the art and will be described in detail below.

DETAILED DESCRIPTION OF THE INVENTION

Figure 1:
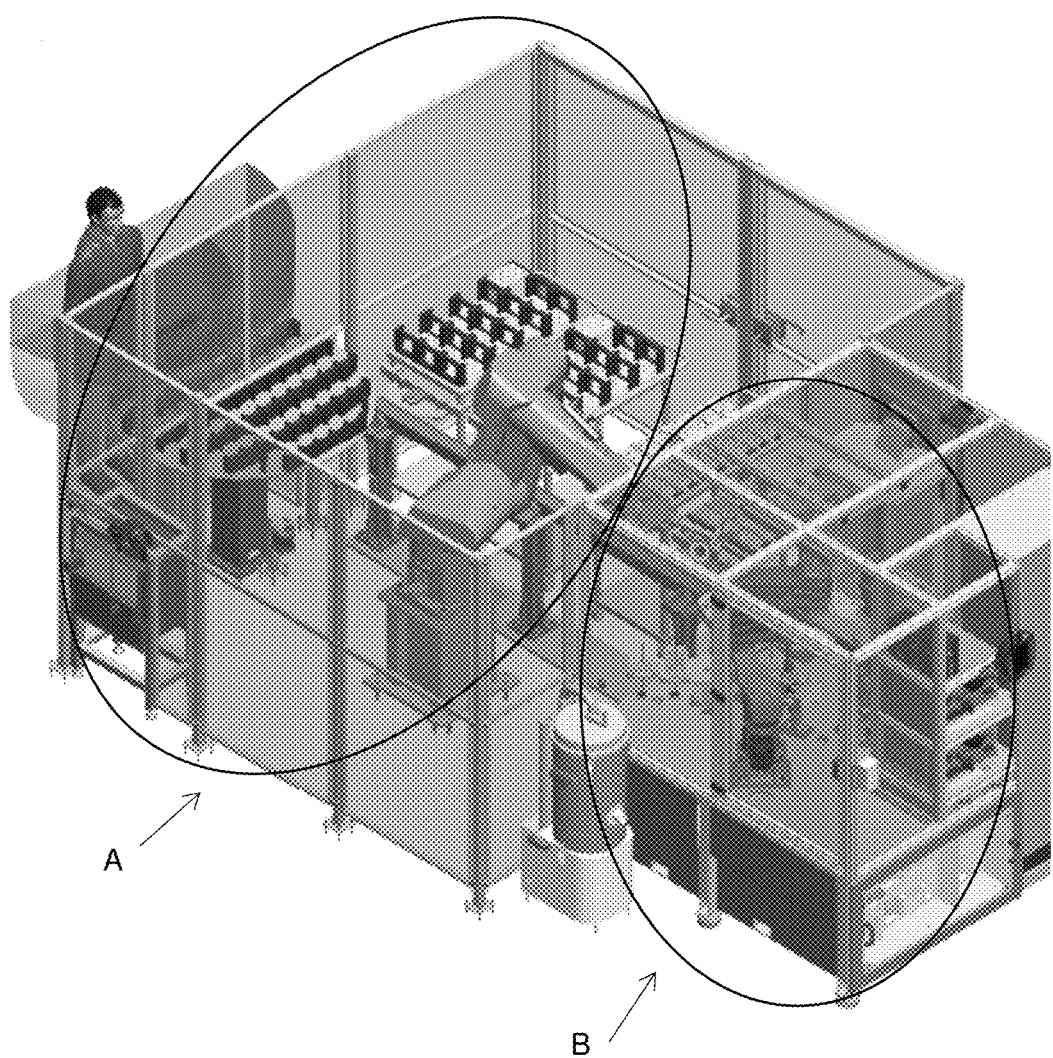
FIG. 1 shows a perspective view of an implementation of the propagation material entry and sample output machine (A) of the present invention associated with the anti-contaminant sample captation machine (B) of the present invention.

The following descriptions are given as examples and are not limiting to the scope of the invention and will provide a clearer understanding of the object of this patent application.

For purposes of the present invention, the term "propagation material" comprises any material that can be propagated by taking a sample, such as seeds, twigs, branches, roots, leaves, etc.

The term "sampled propagation material" comprises propagation material after a sample of the material has been collected in a non-destructive manner.

The term "propagation material sample" comprises the sample taken from a propagation material in a non-destructive manner.

In a first object, the present invention presents an automatic propagation material sampling system that comprises at least one anti-contaminant propagation material sample captation machine (B).

The anti-contaminant sample captation machine (B) comprises an anti-contaminant propagation material sample transfer, projecting it in free fall. In this way, the anti-contaminant propagation material sample captation machine (B), when performing the sample cut, said sample is transferred by means of gravitational attraction. The sample then falls in free fall onto a microplate that stores samples of the propagation material.

Sample transfer by gravitational attraction causes the sample, when projected in free fall, to be transferred to a sample storage microplate without the sample coming into contact with other parts of the machine. In this way, the free fall transfer prevents samples from coming into contact with surfaces that are contaminated by fragments of other seeds, dust, accumulated residues or any particles that could contaminate the sample and compromise the quality of the sample.

The anti-contaminant sample captation machine (B) extracts each sample from the propagation material maintaining the propagating capacity of the sampled propagation material. After transferring the sample from the propagation material to the microplates, the microplates loaded with samples are sent for laboratory analysis.

In an implementation, the system of the present invention comprises at least one propagation material entry and sample output machine (A) which comprises storing propagation material samples from the anti-contaminant sample captation machine (B).

After cutting the propagation material sample, the sample is transferred to propagation material sample storage microplates. Said transfer occurs through gravitational attraction, in which the sample of propagation material is projected in free fall in the exact direction of the microplate compartment where the samples are stored, without coming into contact with any part of the machines of the present invention, preventing fragments of propagation material to become lodged on surfaces, which could cause contamination of subsequent samples.

In an implementation, sample transfer of propagation material is performed in an anti-contaminant manner. In this way, the sample does not come into contact with other surfaces of the machine, falling in free fall directly into the storage location. Thus, said transfer avoids sample contamination by particles and/or fragments that may be adhered to the walls of the machine, resulting in samples with greater purity, greater quality and reliability.

In an implementation, after sample cutting and free-falling sample projection into a microplate compartment, the system of the present invention performs cleaning of the sample cutting site by means of a debris cleaning device (B36). Also, after the sample is collected, the sample collection device (B80) is cleaned using a cleaning device (B90), thus preventing any residue that could contaminate subsequent samples from remaining.

In an implementation, the system of the present invention comprises at least one sampled propagation material storage machine (C), comprising sampled propagation material storage coming from the anti-contaminant sample captation machine (B) and led to the sampled propagation material storage machine (C) by the propagation material entry and sample output machine (A).

After cutting the propagation material sample, the sampled propagation material is transferred to a sampled propagation material storage plate. Plates loaded with sampled propagation material are stored on sampled propagation material storage shelves (C30) of the sampled propagation material storage machine (C). The transfer of the loaded plates to the storage shelves (C30) is carried out by means of a robotic artificial intelligence. In an implementation, the robotic artificial intelligence of the sampled propagation material storage machine (C) comprises a robot (C20).

In a second object, the present invention presents a propagation material sampling automation process that comprises the steps of: positioning propagation material in an anti-contaminant sample captation machine (B); peeling the propagation material by a propagation material peeling device (B50) of the anti-contaminant sample captation machine (B); taking a sample of propagation material by a sample extraction device (B60) of the anti-contaminant sample captation machine (B); anti-contaminant transfer of the propagation material sample; captation of a sample from the propagation material by a sample collection device (B80) of the anti-contaminant sample captation machine (B); sample output for analysis; and storage of sampled propagation material.

The step of taking a propagation material sample comprises cutting each sample of propagation material, maintaining the ability of subsequent propagation of the sampled propagation material.

The anti-contaminant propagation material sample transfer step comprises projecting the free-falling sample from the sample extraction device (B60) to a sample collection device (B80).

Initially, the propagation material is arranged in envelopes labeled with barcodes. The robotic artificial intelligence of the present invention reads the barcodes on the envelopes with propagation material and, with this, performs the tracking of the propagation material throughout the process. Then, the propagation material enters the process. Envelope tracking helps in controlling samples of propagation material, for example, in cases where a given sample of propagation material has certain characteristics of interest.

Then, a non-destructive propagation material sample is taken and free-falling directly onto a microplate for storing samples of propagation material. After that, the microplates loaded with samples of propagation material are sent for analysis in the laboratory.

Subsequently, the sampled propagation material is stored on storage shelves (C30) and labeled with a barcode by means of a robotic artificial intelligence. In this way, the sampled propagation material is traced, from the envelope that contained the material, to the exact storage location on the shelves.

In a third object, the present invention presents a propagation material sampling equipment that comprises at least one anti-contaminating propagation material sample captation machine (B), said machine (B) comprising: at least one propagation material sample extraction device (B60); and at least one sample collection device (B80).

The anti-contaminant sample captation machine (B) comprises anti-contaminant propagation material sample transfer, projecting it in free fall from the sample extraction device (B60) to the sample collection device (B80). This type of free-fall transfer, that is, without the use of physical mechanisms for sample transfer, such as sample transport mats, makes it possible to obtain samples without contamination by fragments from other seeds or accumulative residues. Thus, the purity of the samples and consequently the higher quality and greater precision of the sample analysis in the laboratory provides greater sample reliability. In this way, the sample is stored individually on the microplates.

The sample extraction device (B60) extracts each propagation material sample maintaining the propagating capability of the sampled propagation material. The sample extraction device (B60) comprises an extraction tool (B62) to extract propagation material samples in a non-destructive way, that is, without preventing further propagation of the material. In an implementation, said extraction tool (B62) comprises a machining tool. In an implementation, the extraction tool (B62) comprises at least one of: cutting blades, drills, saw, or any device that performs cutting of propagation material samples in a mechanical and non-destructive way.

In an implementation, the handling robot (A60) comprises a robotic artificial intelligence that manipulates the microplates loaded with samples of propagation material and the plates loaded with sampled propagation material. In addition, robotic artificial intelligence scans the barcodes of envelopes with propagation material, plates and microplates and performs tracking of samples and sampled propagation material.

The anti-contaminant sample captation machine (B) comprises a set of devices that allow contamination-free captation of samples of propagation material, preventing contamination by unwanted materials such as stones, soil, peels, and even preventing contamination between samples of the propagation material.

The anti-contaminant sample captation machine (B) comprises at least one propagation material sample extraction device (B60) and at least one sample collection device (B80). The anti-contaminant sample captation machine (B) comprises anti-contaminant propagation material sample transfer, projecting it in free fall from the sample extraction device (B60) to the sample collection device (B80). The free fall projection of the sample prevents the sample from touching any surface of the machine, thus preventing the adhesion of sample particles that could contaminate future samples, thus differing from the previous ones, which make use of conveyors and other machines for the transfer of samples.

Furthermore, in relation to the anti-contaminant transfer of the sample, the sample extraction device (B60) comprises at least one inlet cavity (B61) where propagation material is positioned by the handling device (B40). The inlet cavity (B61) allows at least a portion of the propagation material to be positioned inside the sample extraction device (B60), so that an extraction tool (B62) of the sample extraction device (B60) extracts a propagation material sample. The extracted sample falls, under the effect of gravity, in free fall, passing through a cavity (B63) of the sample extraction device (B60) towards the sample collection device (B80) without coming into contact with any other part of the sample machine of the present invention from the extraction tool (B62) to the microplate in the sample collection device (B80).

Figure 15:
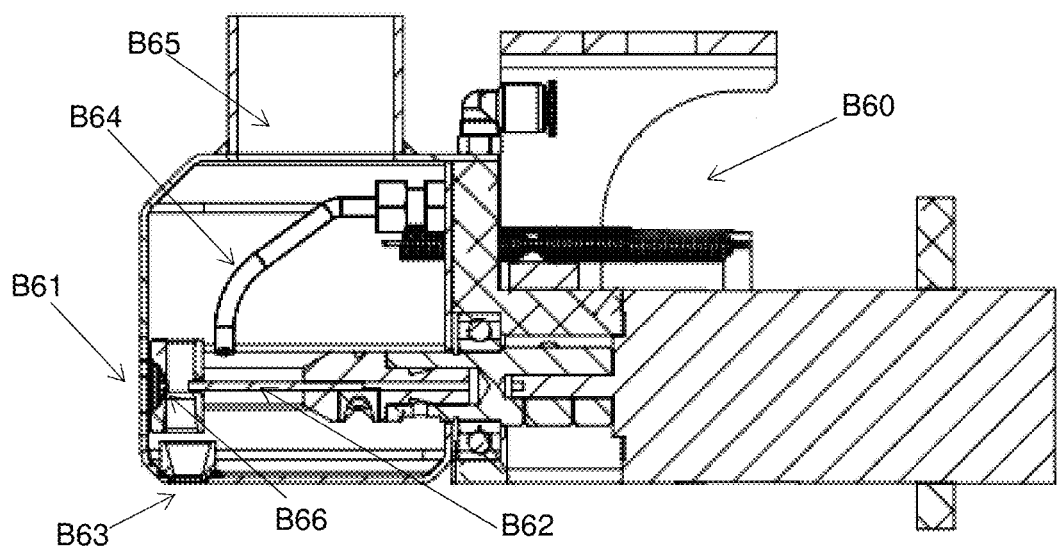
FIG. 15 shows the A-A section shown in FIG. 14.
Figure 16:
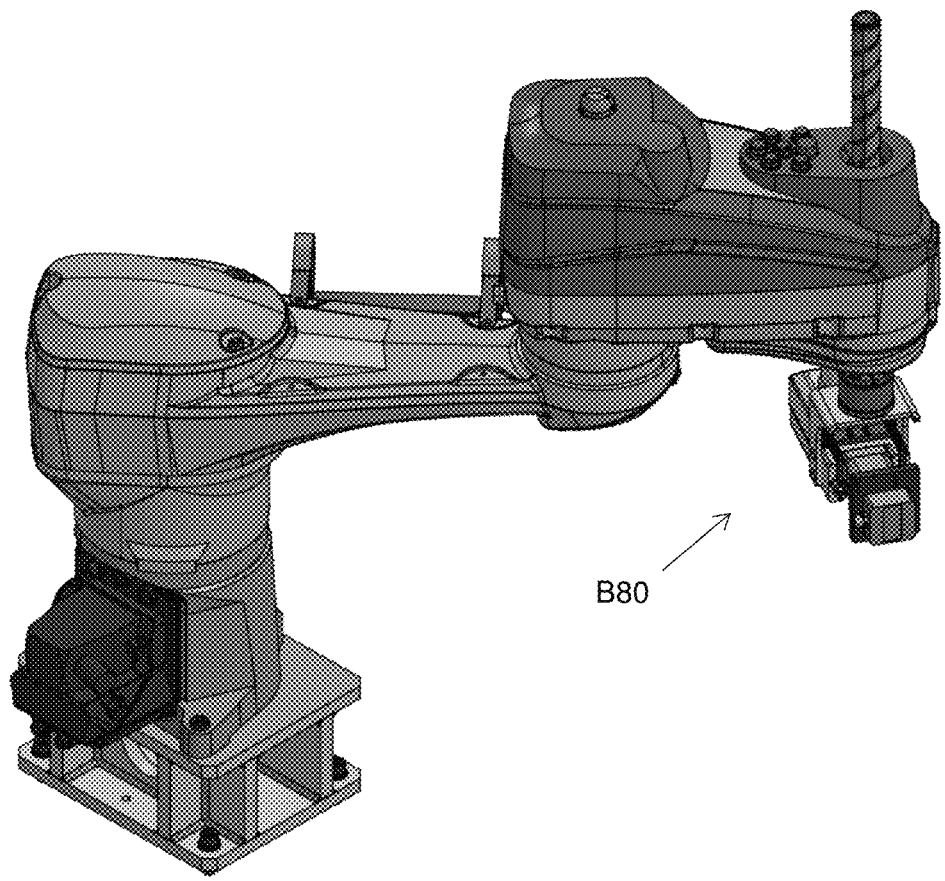
FIG. 16 shows an implementation of the sample collection device (B80) of the anti-contaminant sample captation machine (B) of the present invention.
Figure 17:
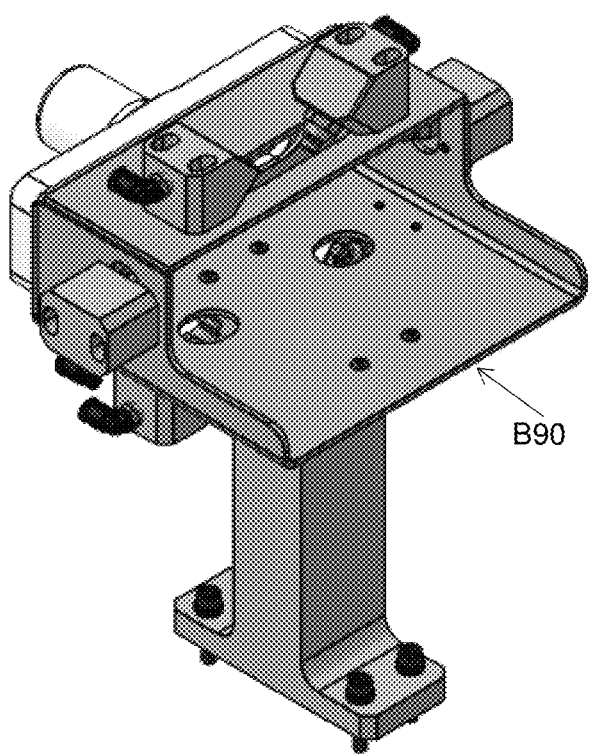
FIG. 17 shows an implementation of the cleaning device (B90) of the present invention.

In an implementation, as illustrated in FIG. 15, the cavity (B63) comprises a truncated cone-shaped guide. Preferably, the cavity (B63) is free of guides.

In an implementation, the sample extraction device (B60) further comprises a set of anti-contamination aid components. In an implementation, the sample extraction device (B60) comprises at least one fluid projection tube (B64) and at least one exhaust channel (B65), wherein each time a sample is extracted from the propagation material, the tube (B64) projects fluid over the extraction tool (B62) and/or over the inlet cavity (B61), removing any fragments of the sampled propagation material, as well as the exhaust channel (B65) performs the exhaustion of the projected fluid and propagation material fragments, contributing to the anti-contamination characteristic of the present invention, so that each subsequent sample extracted is not contaminated by the previous sample. In an implementation, the projected fluid is compressed air.

In another implementation, the sample collection device (B80) comprises a cleaning device (B90) which, by means of fluid blowing, after the sample collection, cleans the sample collection device (B80), preventing that any fragments of collected samples remain in the sample collection device (B80), which could contaminate subsequent samples.

In an implementation, the inlet cavity (B61) comprises an orifice (B66), so that when a propagation material is positioned in the inlet cavity (B61), a predetermined volume of propagation material passes through said orifice (B66). In this way, the extraction tool (B62) extracts from the propagation material only the predetermined volume that passes through the orifice (B66), maintaining the ability of further propagating the propagation material. Thus, the present invention allows considering the dimensional variation of propagation materials, which, as they are living organisms, undergo considerable variation. The dimensional study of propagation materials of the present invention allows the tool size and hole diameter to be predetermined as a function of the propagation material to be sampled.

The anti-contaminant sample captation machine (B) comprises at least one propagation material peeling device (B50), which peels each propagation material before taking the first material sample.

In an implementation, the anti-contaminant sample captation machine (B) is associated with at least one propagation material entry and sample output machine (A), which comprises at least one propagation material handling robot (A60). The handling robot (A60) transfers the propagation material from the propagation material inlet to the anti-contaminant sample captation machine (B) and takes the propagation material samples and the material of propagation sampled from the anti-contaminant sample captation machine (B).

The anti-contaminant sample captation machine (B) and the propagation material entry and sample output machine (A) are associated with a sampled propagation material storage machine (C), which stores the sampled propagation material, from the anti-contaminant sample captation machine (B) and led to the sampled propagation material storage machine (C) by the propagation material entry and sample output machine (A).

Example 1—Seed Sampling System

The examples shown here are intended only to exemplify one of the numerous ways to realize the invention, without limiting its scope.

The present invention presents a solution for anti-contaminating sampling of propagation materials that comprises the association of three machines: the propagation material entry and sample output machine (A), the anti-contaminant sample captation machine (B) and the sampled propagation material storage machine (C); which together perform seed sample cutting, sample tracking and sampled seeds, transport and storage without contamination by residues.

Figure 2:
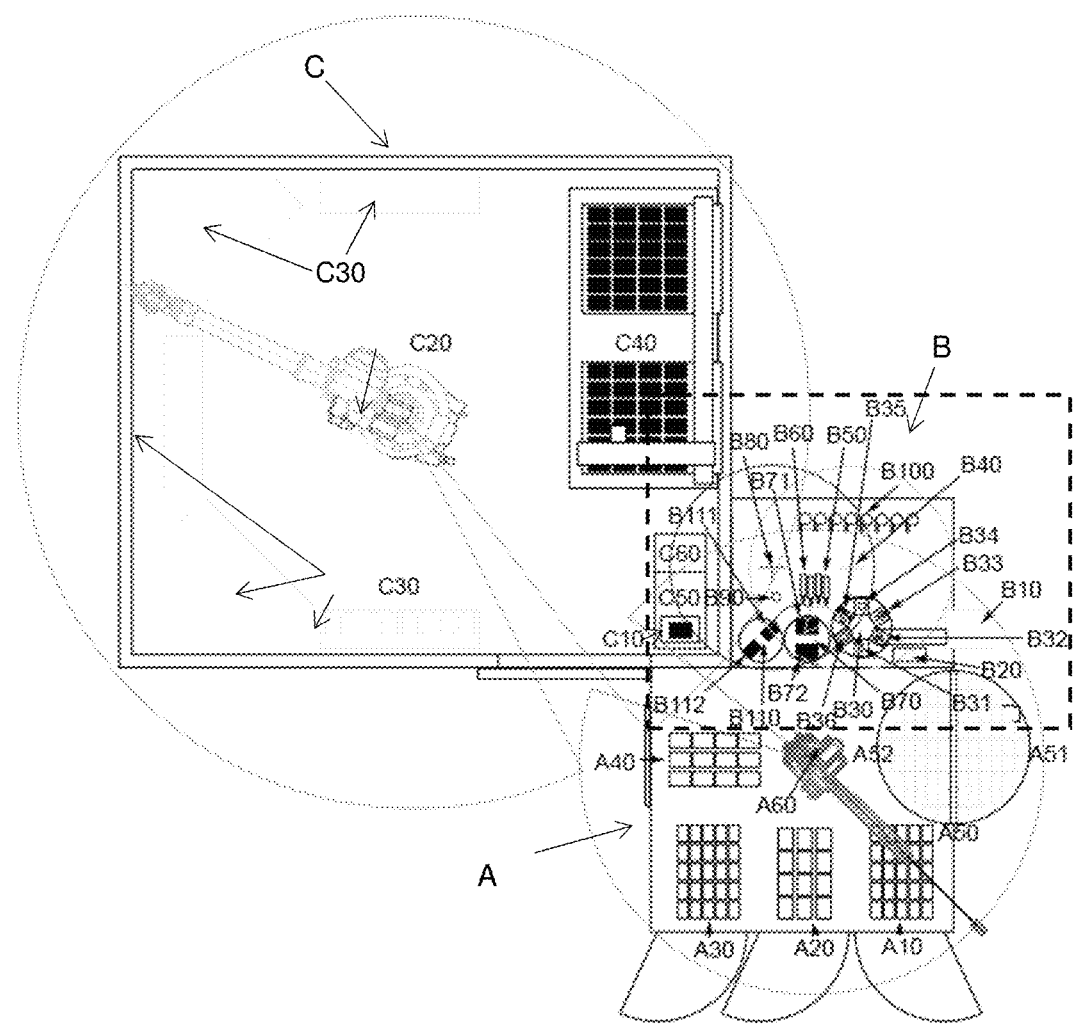
FIG. 2 shows an implementation of a schematic representation of the equipment of the present invention, where the propagation material entry and sample output machine (A), the anti-contaminant sample captation machine (B) and the sampled propagation material storage machine (C) are shown.
Figure 3:
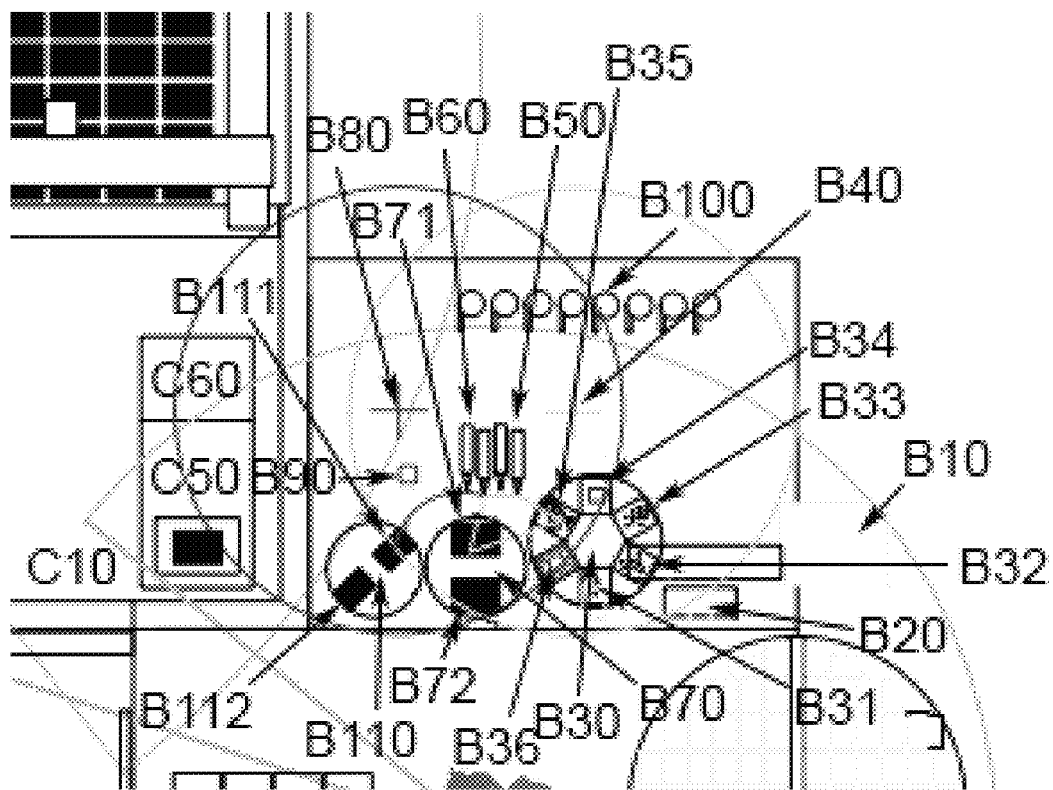
FIG. 3 shows the anti-contaminant sample captation machine (B) presented in FIG. 2.
Figure 4:
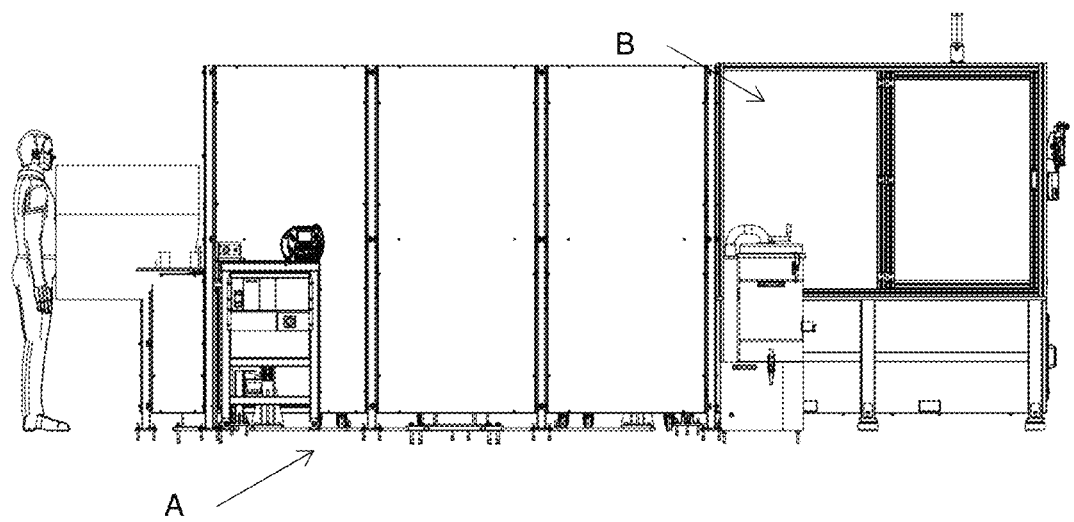
FIG. 4 shows the side view of the implementation of FIG. 1.
Figure 5:
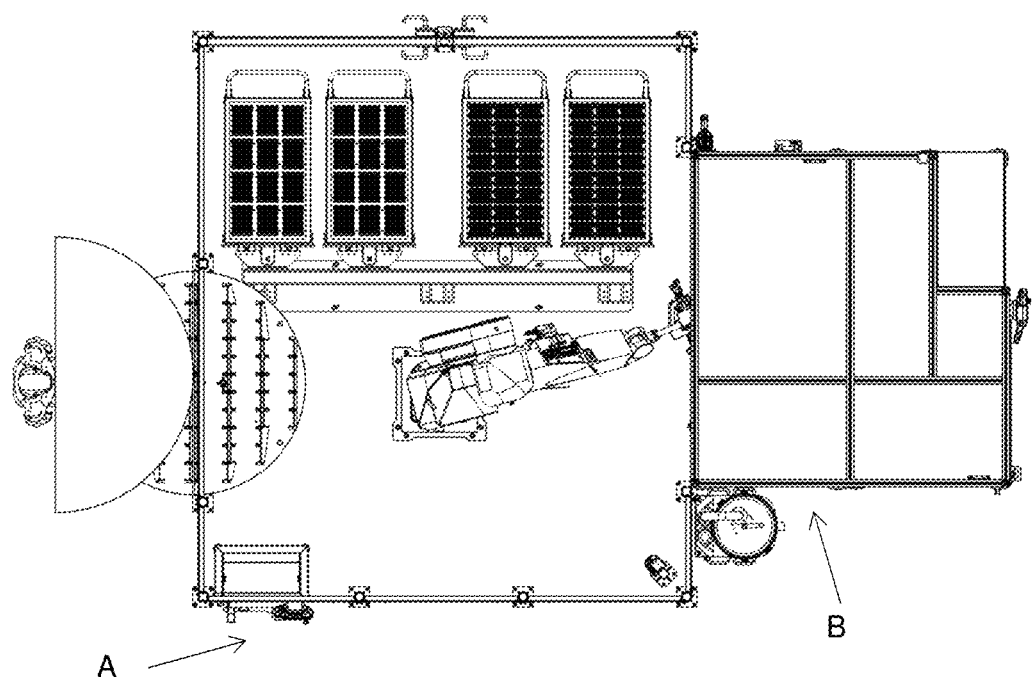
FIG. 5 shows the top view of the implementation of FIG. 1.

FIG. 2 illustrates a schematic of the three machines and said stations described below.

Machine A: Entry of Seeds for Sampling and Output of Sampled Seeds.

Station A10—Entry of empty microplates: At this station, the microplate is stacked in a laboratory cart prepared for referencing and indexing to the robot. The maneuver of removing and placing the car in the station is done by an operator. The car is located in an area protected by a physical barrier (grid and gate) and the gate is unlocked upon request to stop the robotic cell to ensure operator safety. Immediately after the completion of the operating routine, the robot stops and the safety key is unlocked, thus allowing the door to be opened by the operator to perform the maneuver.

Station A20—Entry of empty plates: In a similar way to the previous station, the plates enter through a car prepared for referencing and indexing, to be sent to the filling of seeds sampled in machine B. The operation and safety of this station are identical to station A30.

Station A30—Output of microplates loaded with seed samples: At this station, microplates with samples are sent for analysis in the laboratory. Operation and safety of this station are identical to station 30.

Station A40—Contingency output of plates loaded with sampled seeds: At this station, plates with the seeds sampled for analysis in the laboratory come out. This operation only occurs in a contingency process when any system of machine C is stopped. The operation and safety of this station are identical to station 30.

Station A50—Turntable for feeding envelopes with seeds: In this turntable implementation, with automatic indexing lock, the filling of the envelopes is conducted manually.

Figure 6:
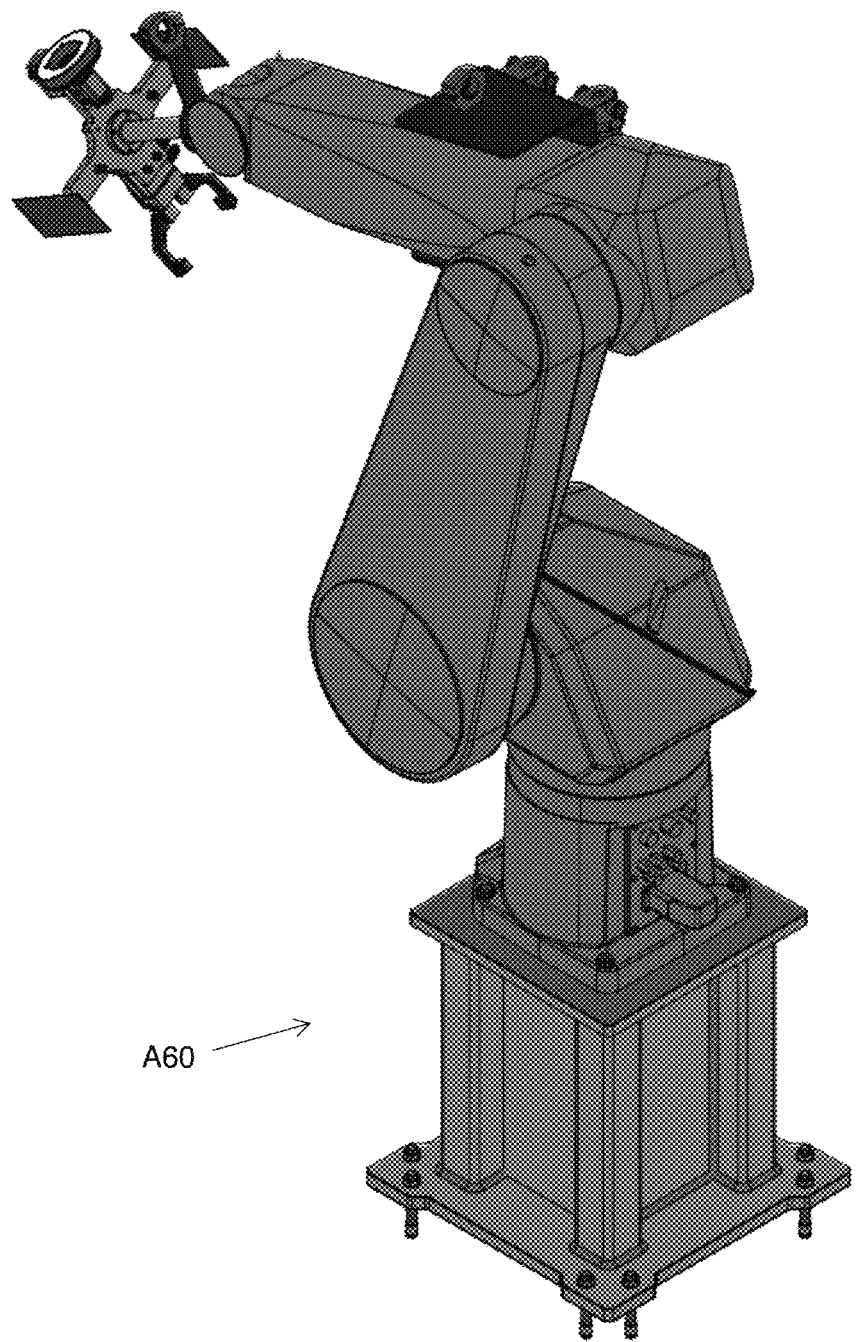
FIG. 6 shows an implementation of the handling robot (A60) of the propagation material entry and sample output machine (A) of the present invention.
Figure 7:
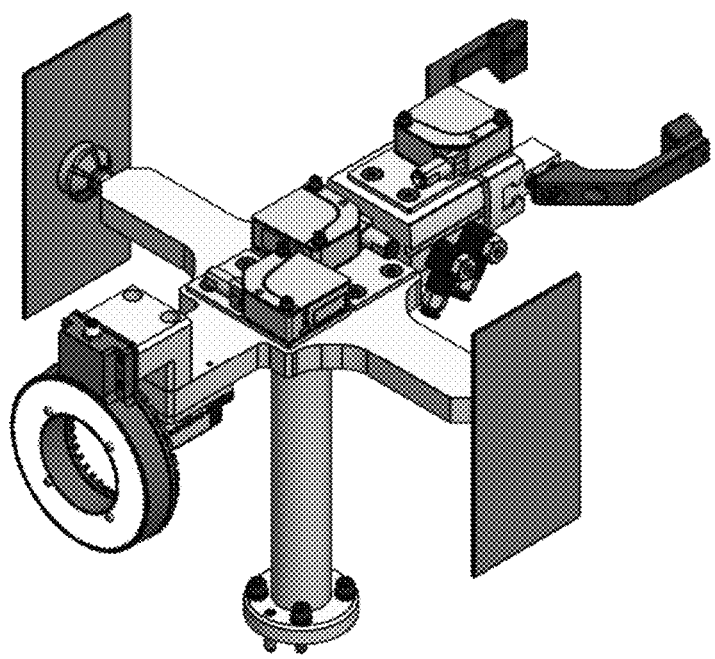
FIG. 7 shows an implementation of the handling robot tools (A60).
Figure 8:
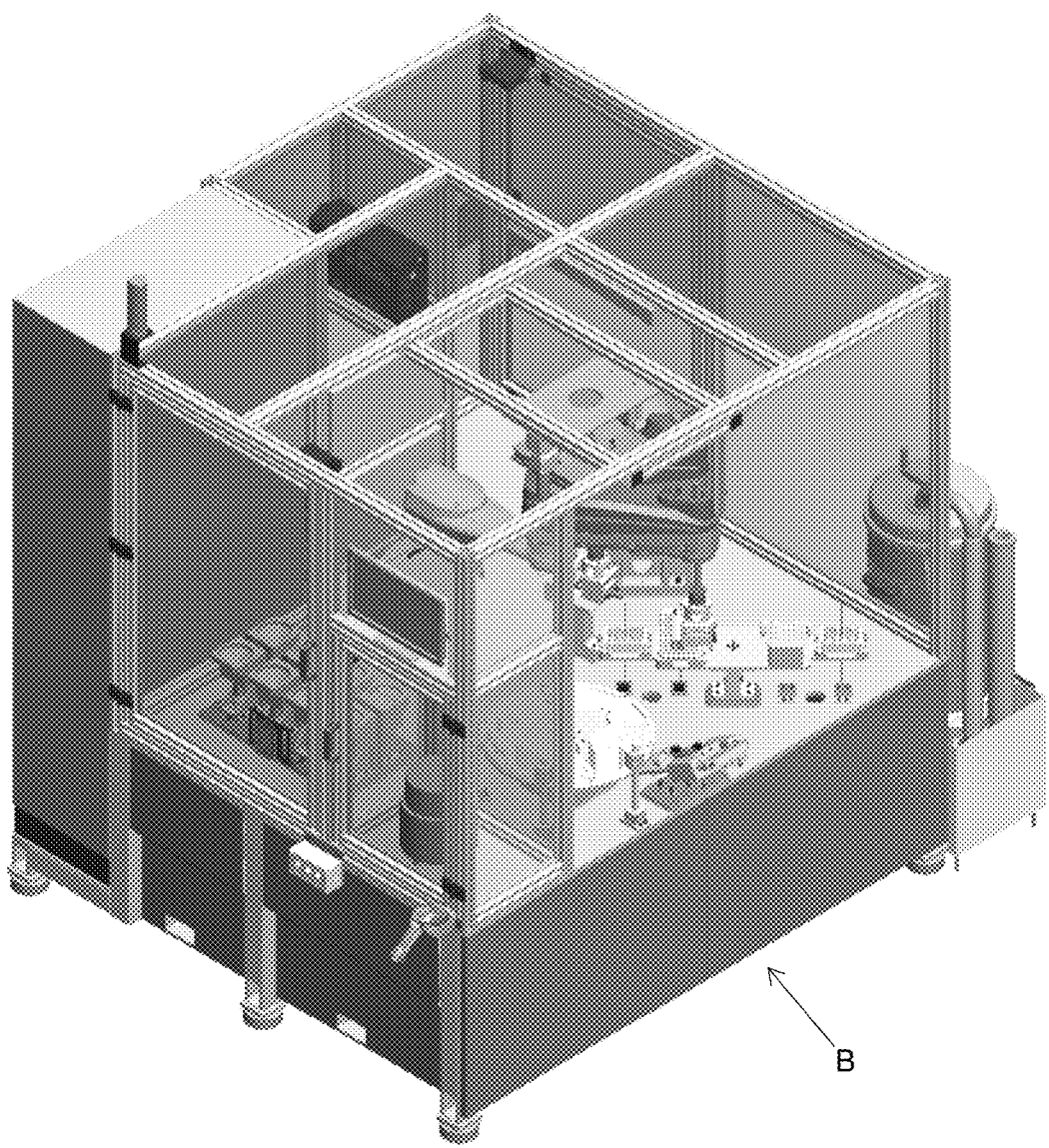
FIG. 8 shows a perspective view of an implementation of the anti-contaminant sample captation machine (B) of the present invention.
Figure 9:
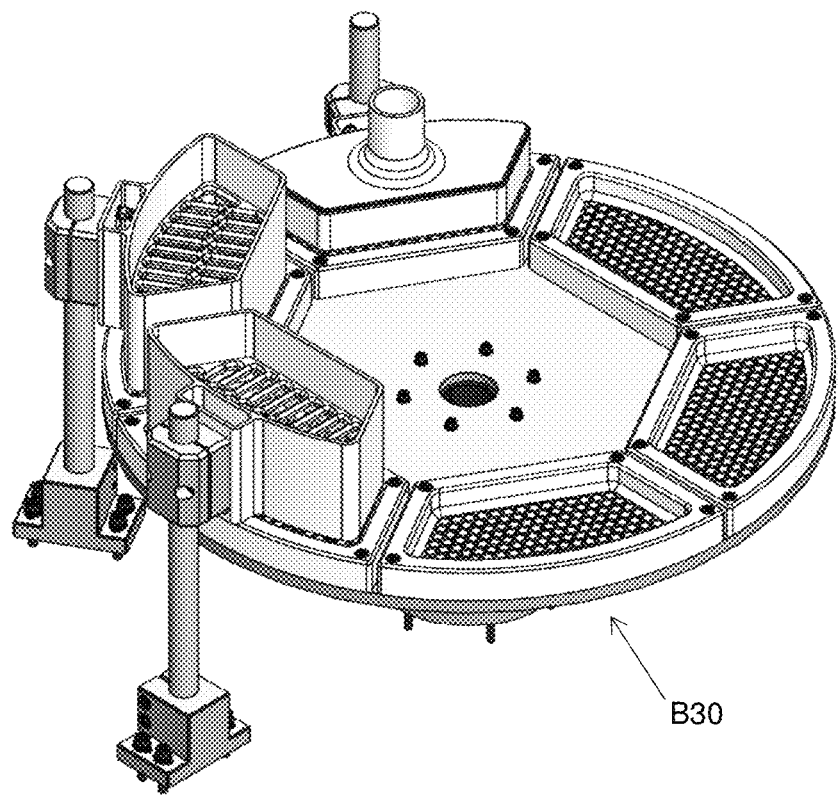
FIG. 9 shows an implementation of a turntable (B30) of the anti-contaminant sample captation machine (B) of the present invention.
Figure 10:
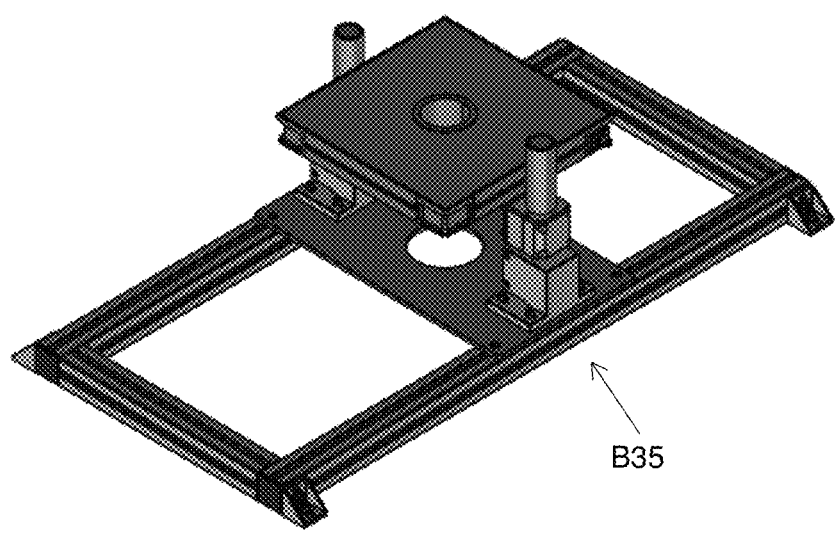
FIG. 10 shows an implementation of the inspection device (B35) of the sampling material of the anti-contaminant sample captation machine (B) of the present invention.
Figure 11:
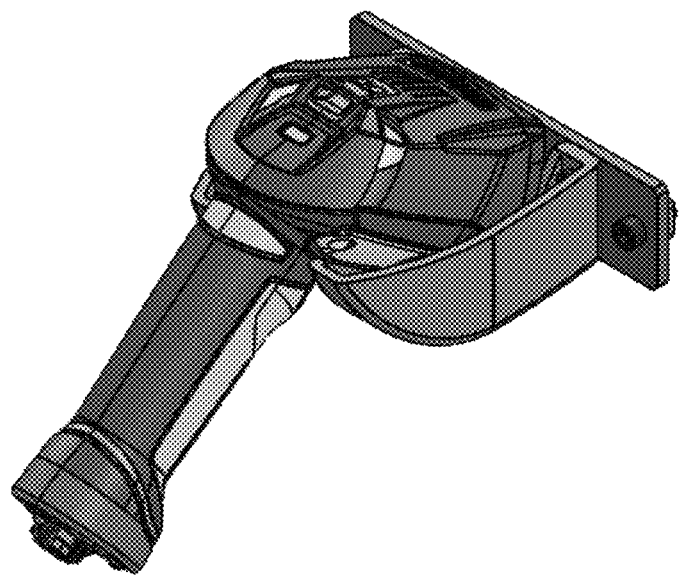
FIG. 11 shows an implementation of the sample material reading device holder of the inspection device (B35) of the sampling material of the anti-contaminant sample captation machine (B) of the present invention.
Figure 12:
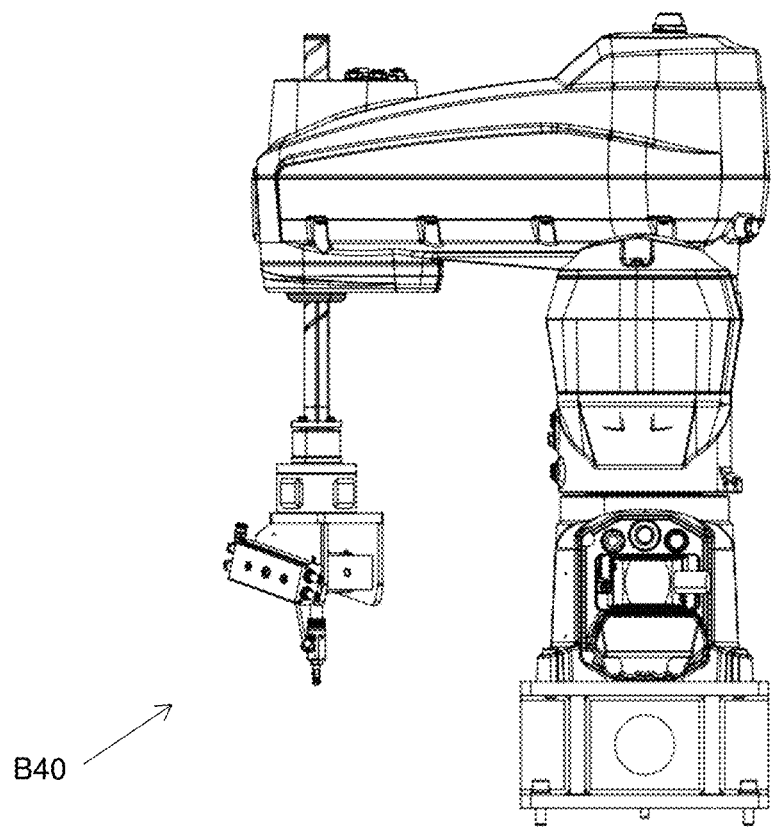
FIG. 12 shows an implementation of the propagation material handling device (B40) of the anti-contaminant sample captation machine (B) of the present invention.
Figure 13:
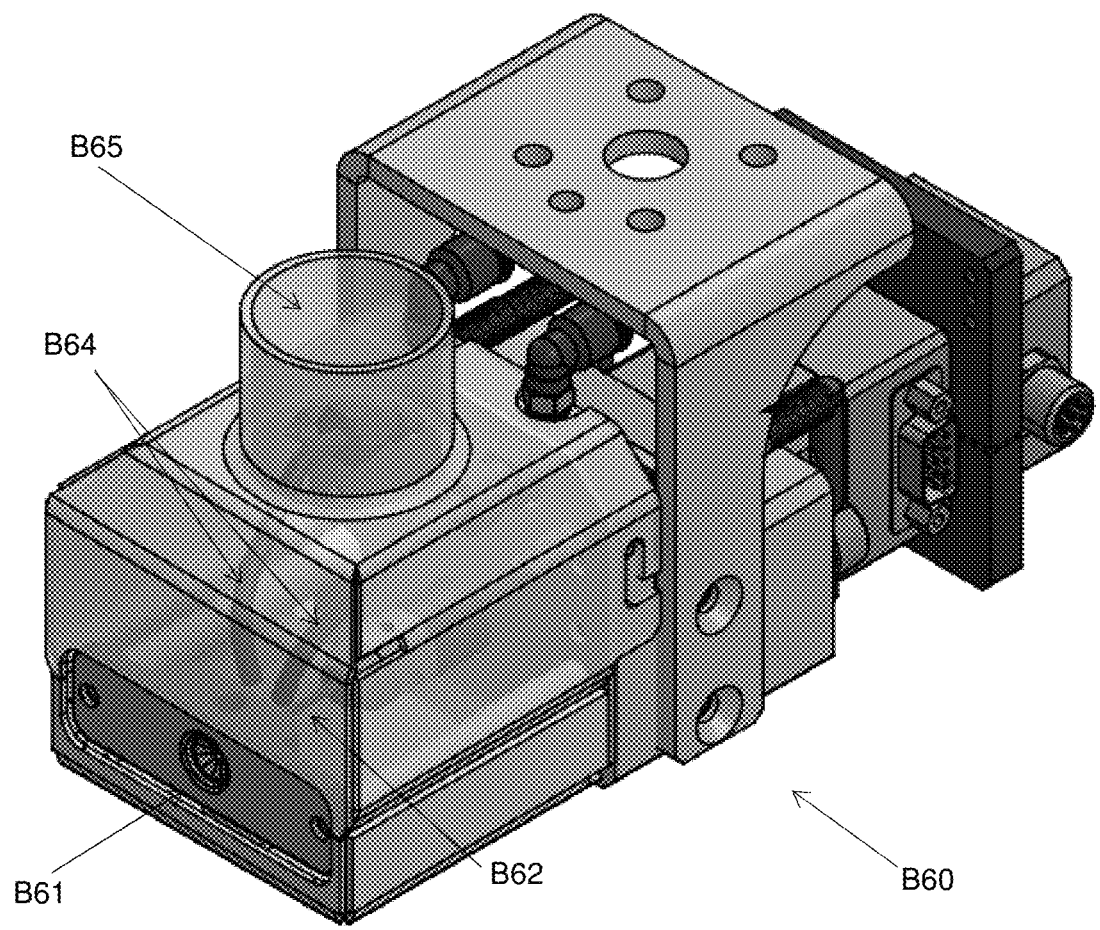
FIG. 13 shows a perspective view of an implementation of the sample extraction device (B60) of the anti-contaminant sample captation machine (B) of the present invention.
Figure 14:
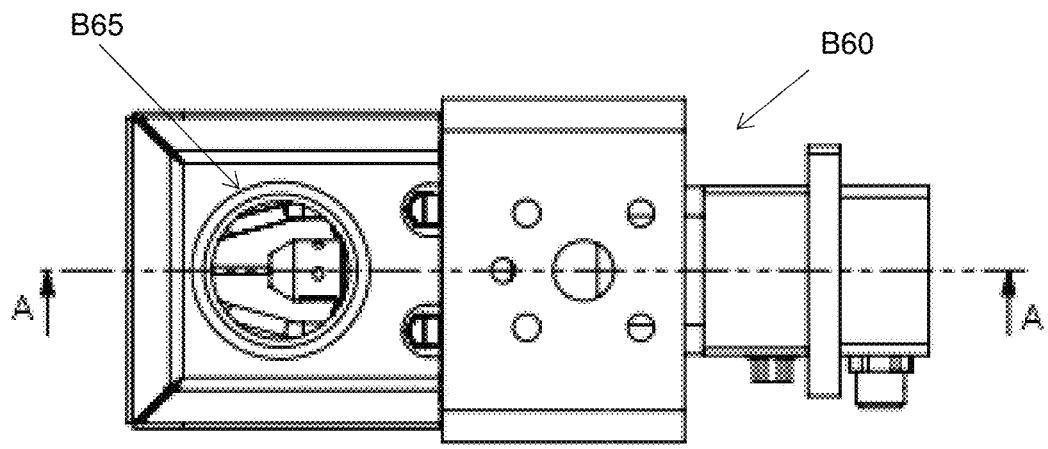
FIG. 14 shows a top view of the implementation shown in FIG. 13.

Station A60—Robot for handling and reading barcodes for plates, microplates and envelopes, illustrated in FIG. 6. This Robot is equipped with a pneumatic gripper, a camera and a suction cup, which are illustrated in FIG. 7. Handling of the envelopes is conducted through a vacuum suction cup and the handling of plates and microplates through a pneumatic gripper. With the barcode reader, labels on envelopes, plates and microplates are identified. The reading routine and the arrangement of the data entry to the tracking software are done automatically.

Machine B: Seed Sampling and Preparation for Storage.

Station B10—Large batch supply silo: In this silo the seed batches are supplied so that it is not necessary to pass through the A50 table in envelopes. In this implementation, the filling is done manually and the segregation of a portion for operation in the machine is automatic. At this station, an operator scans the tracking code on the seed package/container with a barcode reader. When performing this operation, a magnetic safety lock releases the silo lid. In this way, the operator can open it and feed the silo with seeds. The machine will only start operating again when the cover is closed and, this way, the lid will be locked again to avoid feeding without new tracking control. When reading a new tracking batch, the lid will only be unlocked if the operator chooses the 'end of batch' operation. Checking the end of the batch and the total emptying of this equipment is a manual task, and the operator is responsible for this procedure.

Station B20—Envelope cutting device: This device is used to cut, discard the cut envelope and collect seeds in the collection and inspection tray. The robot places the envelope on the device that cuts it with a scissor-like blade. The robot opens and takes the cut envelope to the turntable at the seed entry position.

Station B30—Turntable: This station is equipped with a turntable with a top containing 6 seed collection trays, which occupy the following positions equally distributed: B31—envelope seed entry station; B32 seed entry station through the silo (interface with Station B10); B33 buffer; B34 buffer; B35 automatic inspection station with vision system and seed pick up by robot; B36—tray cleaning station with air suction system; The dynamics of the process takes place in parallel in the 6 stations, each with its own function.

Station B35—Inspection equipment: Equipped with a Cognex vision system and lighting modules, this station has the function of differentiating the seeds from impurities such as stones, leaves, pods, insects or other bodies that do not resemble the seeds. The second feature of this system is to generate the coordinates so that the robot of this machine can go exactly to the point where each seed is in order to pick it up.

Station B36—Vacuum cleaner for cleaning seed residues: This station is equipped with an industrial vacuum cleaner that is connected through ducts and hoods to the Sample Extraction Devices (B50 and B60), the table cleaning station (B36) and the sample collector cleaning device (B90).

Station B40—seed handling device: This robot has the role of taking the seed from the inspection tray, taking it to machining and then placing the sampled seed on the plate. For each microplate, a determined number of samples, around three, will come from the control group. In this case, the robot's grip routine switches from the inspection tray to one of eight controls, while the choice is programmable at the customer's discretion.

Station B100—Control group: Equipped with eight vibratory feeders, where each one holds a different type of seed control.

Machine C: Seed Packaging with Post-Result of Sampling Analysis.

Station C10—Entry of plates loaded with sampled seeds: This station is a transition zone of the plate with sampled seeds leaving Machine B and going to Machine C. The transportation of the plate is performed by the Machine A robot that leaves it at this point available for the robot from Machine C to pick up.

Station C20—Robot for handling plates in storage and output on the XYZ device: This station consists of a robot equipped with a pneumatic gripper and a camera. Using the gripper, the robot picks up the plate, loads the sampled seeds and takes them to storage (C30). In the same storage (C30) the sampled plates that are in the storage output list are taken by this same robot to be placed in the XYZ device (C40). When activated for this operation, the robot goes to the corresponding position in the storage memory and, before picking up the plate, scans the barcode on the plate to confirm the correct tracking code.

Station C30—Shelves for storing plates with sampled seeds.

Station C40—XYZ device for forming new batches: This station, through an XYZ cartesian device, covers the entire supply area of the plates with seeds to be packed. A head on the Z axis is equipped with a vacuum seed collector and a batch storage drawer for packaging. The collected seeds form a new batch in the machine head and, after this operation is completed, this batch is sent by pneumatic blowing carried by a hose, which takes the seeds to the packaging machine.

Station C50—Automatic packaging machine for new batches of seeds: At this station, an automatic packaging machine receives the seeds from the XYZ system and packs and seals the package that will contain a new batch of seeds.

Station C60—Automatic labeling machine for identification and tracking of new seed batches: This station makes up the output of the packaged seeds along with the packaging machine. This labeling machine automatically applies the label with the tracking code to the package. After application, the package is detached and stored in an output box for manual pickup by the operator.

The inventive concept now revealed and exemplified in one or more ways was treated as an industrial secret and was not previously disclosed until the time of filing this patent application. This industrial secret is the applicant's intangible asset. The eventual future publication of the patent application does not, in itself, constitute authorization for use by third parties, serving only as: (i) informing third parties of the existence of said industrial secret on the filing date; (ii) unequivocal indication of its holder; and (iii) encouraging the development of new improvements based on the concept revealed herein, to avoid reinvestment in the development of the same asset already held by the applicant. It is immediately warned that any commercial use requires authorization from the holder, and that unauthorized use entails sanctions provided by law. In this context, it is hereby clarified that from the disclosure of the present inventive concept, those skilled in the art may consider other ways of implementing the invention not identical to those merely exemplified above, but that in the event of an intended commercial use such forms may be considered to be within the scope of the appended claims.

The invention claimed is:

1. An automatic propagation material sampling system, comprising:
   at least one anti-contaminant sample captation machine comprising at least one sample extraction device and at least one sample collection device configured to:
      extract at least one sample from a propagation material, wherein the at least one sample is extracted by maintaining a propagation capacity of a sampled propagation material, and wherein the at least one sample extraction device, comprises:
         an inlet cavity with an orifice, wherein the propagation material is positioned in the inlet cavity, and wherein a predetermined volume of the propagation material passes through the orifice,
         an extraction tool configured to extract the at least one sample from the propagation material, wherein the extraction tool is configured to extract the predetermined volume of the propagation material to maintain the propagation capacity of the sampled propagation material,
         a cavity, wherein the at least one sample passes through the cavity after extraction,
         at least one fluid projection tube configured to project fluid over the sample extraction tool to remove fragments of the sampled propagation material after the at least one sample is extracted, and at least one exhaust channel configured to exhaust the projected fluid and the fragments; and
      project the at least one sample in a free fall to transfer the at least one sample by means of gravitational attraction, wherein the gravitational attraction causes the at least one sample to be transferred to a sample storage microplate in the sample collection device that is configured to collect the at least one sample when projected in the free fall, passing through the cavity of the at least one sample extraction device towards the sample collection device.

2. The system of claim 1, further comprises at least one propagation material entry and sample output machine configured to store the at least one sample from the anti-contaminant sample captation machine.

3. The system of claim 2, further comprises at least one sampled propagation material storage machine configured to store the sampled propagation material, coming from the at least one anti-contaminant sample captation machine and led to the at least one sampled propagation material storage machine by the at least one propagation material entry and sample output machine.

4. A propagation material sampling automation process, comprising:
   positioning of a propagation material in an anti-contaminant sample captation machine, wherein the anti-contaminant sample captation machine comprises a sample extraction device and a sample collection device, and wherein the propagation material is positioned in an inlet cavity with an orifice, of the sample extraction device;
   extracting a sample from the propagation material by an extraction tool of the sample extraction device of the anti-contaminant sample captation machine, wherein a predetermined volume of the propagation material passes through the orifice and wherein the predetermined volume of the propagation material is extracted, by the extraction tool, to maintain the propagation capacity of the sampled propagation material;
   projecting the sample in a free fall to transfer the sample by means of gravitational attraction, wherein the gravitational attraction causes the sample to be transferred to a sample storage microplate in the sample collection device when projected in the free fall;
   collecting the sample extracted from the propagation material in the sample storage microplate of the sample collection device of the anti-contaminant sample captation machine, wherein the sample, when projected in the free fall, passes through a cavity of the sample extraction device towards the sample collection device;
   storing of the sample of the propagation material in the sample storage microplate; and
   projecting fluid over the sample extraction tool, using at least one fluid projection tube in the sample extraction device, to remove fragments of the sampled propagation material after the sample is extracted, wherein the projected fluid and the fragments are exhausted via at least one exhaust channel in the sample extraction device.

5. The process of claim 4, wherein the process further comprises cleaning the sample extraction device after projecting the sample in the free fall.

6. A propagation material sampling equipment comprising:
   at least one anti-contaminant sample captation machine, wherein the at least one anti-contaminant sample captation machine comprises:
      at least one sample extraction device, configured to:
         extract at least one sample from a propagation material, wherein the at least one sample is extracted by maintaining a propagation capacity of a sampled propagation material, and wherein the at least one sample extraction device, comprises:
            an inlet cavity with an orifice, wherein the propagation material is positioned in the inlet cavity, and wherein a predetermined volume of the propagation material passes through the orifice,
            an extraction tool configured to extract the at least one sample from the propagation material, wherein the extraction tool is configured to extract the predetermined volume of the propagation material to maintain the propagation capacity of the sampled propagation material,
            a cavity, wherein the at least one sample passes through the cavity after extraction,
            at least one fluid projection tube configured to project fluid over the sample extraction tool to remove fragments of the sampled propagation material after the at least one sample is extracted, and
            at least one exhaust channel configured to exhaust the projected fluid and the fragments; and
         project the at least one sample in a free fall to transfer the at least one sample by means of gravitational attraction, wherein the gravitational attraction causes the at least one sample to be transferred to a sample storage microplate when projected in the free fall; and
      at least one sample collection device including the sample storage microplate, configured to collect the at least one sample, wherein the at least one sample falls in the free fall passing through the cavity of the at least one sample extraction device towards the sample storage microplate in the at least one sample collection device.

7. The propagation material sampling equipment of claim 6, wherein the at least one anti-contaminant sample captation machine further comprises at least one propagation material peeling device configured to peel the propagation material prior to extraction of the at least one sample.

8. The propagation material sampling equipment of claim 6, wherein the at least one anti-contaminant sample captation machine is associated with at least one propagation material entry and sample output machine, and wherein the at least one propagation material entry and sample output machine comprises at least one propagation material handling robot configured to transfer the propagation material from a propagation material inlet to the anti-contamination sample captation machine and takes the at least one sample and the sampled propagation material from the at least one anti-contaminant sample captation machine.

9. The propagation material sampling equipment of claim 8, wherein the propagation material entry and sample outlet machine, the at least one anti-contaminant sample captation machine are associated with a sampled propagation material storage machine configured to store the sampled propagation material, from the at least one anti-contaminant sample captation machine and led to the sampled propagation material storage machine by the propagation material entry and sample output machine.

* * * * *